Feb. 8, 1944.    H. B. CLARK    2,341,314
TIPPED CUTTING TOOL
Filed March 7, 1941
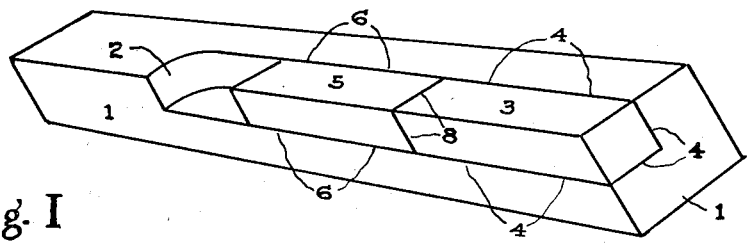
Fig. I
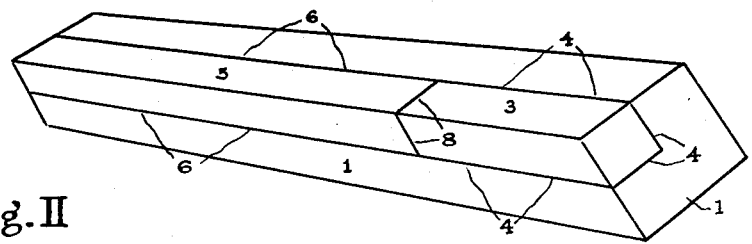
Fig. II
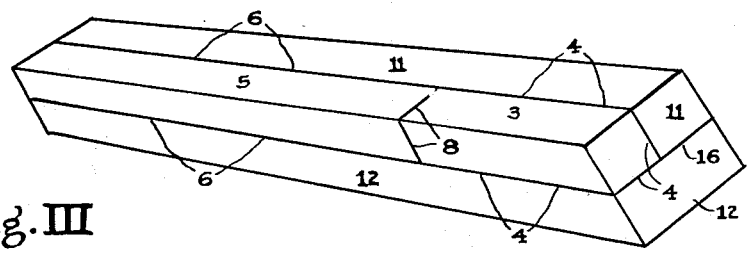
Fig. III
HERBERT B. CLARK
INVENTOR
ATTORNEY Patented Feb. 8, 1944

2,341,314

UNITED STATES PATENT OFFICE 2,341,314

TIPPED CUTTING TOOL

Herbert B. Clark, Libertyville, Ill., assignor to Vascoloy-Ramet Corporation, North Chicago, Ill., a corporation of Delaware Application March 7, 1941, Serial No. 382,215

2 Claims. (Cl. 29—95)

This invention relates to articles or machine parts having one part brazed or soldered to the remainder, and it is particularly applicable to tipped cutting tools which comprise the cutting part made, for example of so-called hard metal brazed to a body or shank. The so-called hard metal is usually an alloy of carbides, borides, nitrides or silicides, while the shank is commonly of more or less high quality steel. According to the prior art the shank has consisted of a unitary body of steel appropriately recessed as by milling, and the cutting tip has been appropriately fitted to be snugly received into the milled recess. The two parts are then secured together, usually by copper brazing. The milling cutter leaves the inner corner of the recess with a rounded contour which requires that the tip have a radius on one corner thereof. Commonly the tip is made initially in this form, but even so, frequently additional grinding must be performed in order to more accurately fit the two parts. This is not only expensive and time-consuming, but also introduces into the process a hand operation which not only slows down the production but also introduces the uncertainties common to all hand operations.

It is an object of my invention to overcome the uncertainty and slowness of the foregoing method by a simple expedient which reduces the operation to a mechanically performed step that can be carried out much more rapidly and at less expense.

Briefly, the present invention contemplates forming a much longer recess and the employment of a tip which is preferably rectangular at its nonworking end. A filler member, preferably of the same quality steel as the shank and of the same cross-section as the tip, is then assembled behind the tip in the milled recess, and the three parts are then brazed together in the conventional manner. The filler member, being positioned immediately behind the tip and securely brazed thereto in the recessed channel, effectively supports the tip from behind, while the shank itself supports the tip from below and in some cases at one side as well.

According to a modification of the invention it is contemplated that the shank member consist of 90°-angle steel bar stock. A portion of the channel thereof is filled with a substantially square piece of the hard material, while the remainder of the channel is filled with the filling and backing member.

In order that the invention may be more clearly understood and readily carried into effect, the application of a cutting part or tip to a tool shank will now be described by way of example, with reference to the accompanying drawing, in which Figure I is a perspective view of one embodiment of the invention, while the remaining figures are similar views of alternative modes of construction.

Referring first to Figure I, a rectangular piece of shank steel 1 is milled out to form a recess, part of which is indicated at 2. At the end thereof intended for operative use, a blank 3 of hard metal composition is positioned so that the outer end thereof corresponds with the outer end of the shank 1. Preferably the inner end is formed or cut square with the other surfaces, but it is obvious that the rear end may be of any shape provided the corresponding end of the filler member 5 conforms to it in shape. When the tip 3 and filler member 5 are positioned in place in the recess 2, they are brazed in place in the usual manner, the braze being indicated at 4, 6 and 8. Brazing 4 unites the tip to the shank; brazing 6 unites the filler member to the shank, while brazing 8 unites the tip and filler member. As shown in Figure I, the filler member does not fill the whole recess, as this is not necessary. Sufficient bearing is provided along the brazing 6 to support the thrust applied at the cutting edge and transmitted through the tip 3 to the backing member 5. However, it is obvious that if desired the filler member 5 can be extended all the way back into the recess 2, having been previously fitted to conform to the recess.

As shown in Figure II, the shank member 1 consists of a piece of L-shaped cross-section. This piece may be formed by milling a slot from a piece of square bar, or the bar may be drawn, rolled or extruded to exact or approximate shape and the slot in this case may merely be dressed to shape by light milling operation. In this case the wear-resisting tip 3 is also substantially square in cross-section to fill the recess of the shank. The filler member in this case extends to the full length of the tool to make a very economical and readily made tool of great versatility. By appropriate rotation of the tool about its long axis it can be used for either right- or left-hand cutting. The use of angle bar stock greatly reduces the cost of the shank material, while the square abutting ends of the tip and filler material reduce the expense of fitting to a minimum, and enable the operation to be carried out on a mass production basis, since individual tips do not have to be fitted to individual shanks.

A further modification of this principle is shown in Figure III, wherein the shank member 1 is replaced by elements 11 and 12, united by braze 16. In this manner the whole tool can be made up of rectangular sections and brazed together in a single operation. All of the elements consist of simple shapes requiring a minimum of dressing operations.

What is claimed is:

1. An article comprising a supporting member of base metal, being provided with an elongated recess of uniform cross-section, an exposed operating member of hard, wear-resisting composition similar in cross-section to the recess of the support but less than the length thereof and adapted to fit therein, and a filling and backing member also similar in cross-section to the recess of the support, less than the length thereof, adapted to fit therein, and also adapted to be seated in said recess adjacent that portion of the hard member opposite its operative end to form a backing therefor in said recess and to at least partially fill said recess, each part of adjacent surfaces of each of said members being securely united to each other.

2. A universal cutting tool comprising a main shank of L-shaped cross section, a hard metal cutting tip mounted at one end of the shank within the angle thereof, an auxiliary shank member located within the angle of the main shank member in abutting relation to said tip, said tip and said auxiliary shank member having similar square cross sections complementary to the L-shaped cross section to provide a composite tool of square cross section throughout the length of the tip and the length of said auxiliary shank member, the abutting surfaces of said main shank member, said auxiliary shank member and said tip being securely united together.

HERBERT B. CLARK.